Sept. 2, 1969 M. L. LAHARTY 3,464,093
BUTT HOOK WITH CHOKER RETAINER AND CHOKER FERRULE
Filed Nov. 14, 1967 2 Sheets-Sheet 1
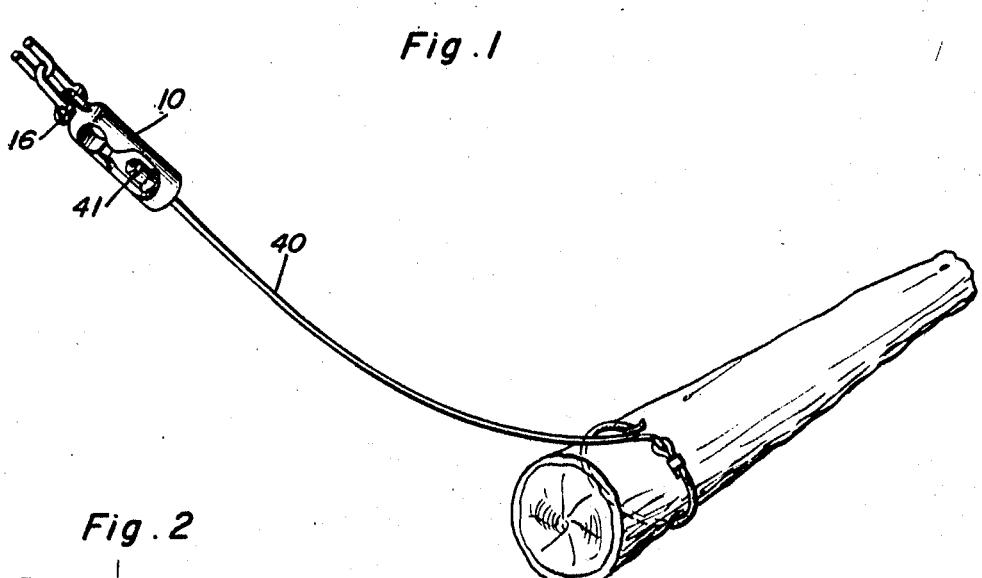
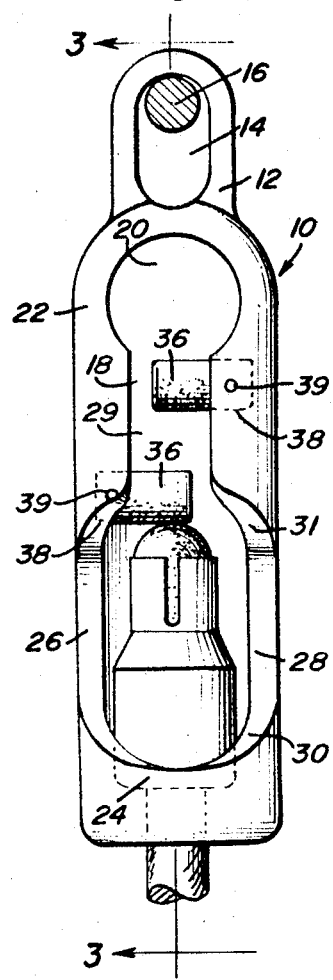
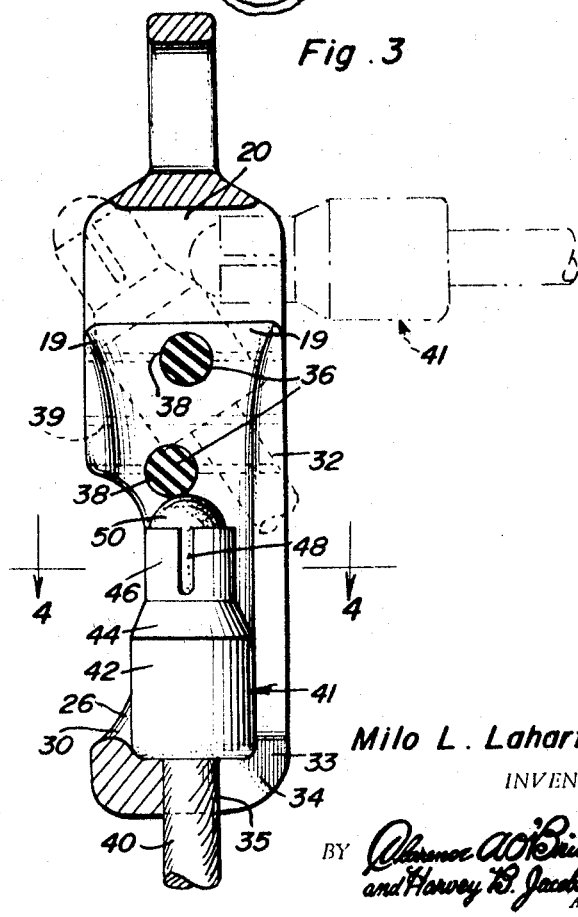
Milo L. Laharty
INVENTOR.

Sept. 2, 1969  M. L. LAHARTY  3,464,093
BUTT HOOK WITH CHOKER RETAINER AND CHOKER FERRULE
Filed Nov. 14, 1967  2 Sheets-Sheet 2

Milo L. Laharty
INVENTOR.

BY *Clarence A. O'Brien
and Harvey B. Jacobson*
Attorneys though but hook 10 is hereinafter referenced as cylindrical in shape, other housing configurations may be utilized without departing from the scope of the appended claims.

United States Patent Office 3,464,093
Patented Sept. 2, 1969

3,464,093
BUTT HOOK WITH CHOKER RETAINER AND CHOKER FERRULE
Milo L. Laharty, Rte. 4, Box 331-J,
Roseburg, Oreg. 97470
Filed Nov. 14, 1967, Ser. No. 682,802
Int. Cl. F16g 11/00; B66c 1/34
U.S. Cl. 24—123
9 Claims

ABSTRACT OF THE DISCLOSURE

A cable fastening assembly including a hollow housing having a central chamber adapted to receive a ferrule terminated choker cable. The ferrule is inserted within the housing by passing it through an enlarged portion of the chamber then through a narrower concentric portion to a final seated position. Rubber rods project inwardly from the interior housing wall into the central chamber above the upward end of a normally seated ferrule to prevent same from becoming unseated. A choker cable is fastened to the ferrule by a babbeting process prior to insertion into the housing.

---

Figure 4:
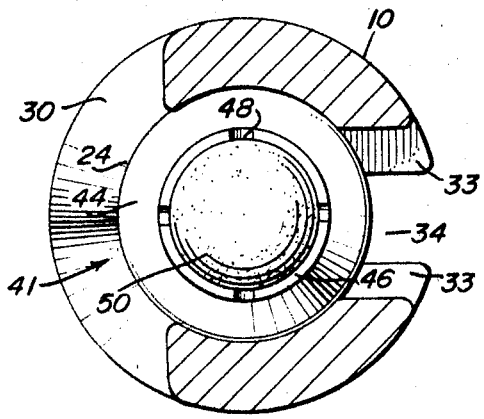

The field of the present invention relates to choker line fasteners employed in logging operations and pertains more specifically to a butt rigging.

In the logging of large timber, after the trees are felled and cut into logs of convenient size, they are transported to a collection point by draglines. Each log is provided with an individual cable called a "choker cable" one end of which is looped around a log, the other end of the cable termination, or ferrule which is capable of remaining The rigging is fastened to a main line pulley system which guides the choker cable securing a log to a remote collection point. After unloading of the log, the cable is transported back to the timber via a haul back pulley line. In prior constructions, butt riggings have suffered from frequent choker cable disconnection when hauled back to the timber area due to the lack of a sufficient restraining means within the butt hook, namely, a choker cable termination, or ferrule which is capable of remaining seated within a butt hook under displacement forces externally applied to the choker cable when no log is secured thereto. In prior devices, the unrestrained ferrule jiggles within the butt hook thereby chafing and marring contacting metal surfaces which eventually weakens the butt rigging structure.

In summary, the present invention comprises a butt hook including an entrance aperture and an externally exposed central chamber communicating with the entrance aperture. The bottom portion of the chamber contains an aperture communicating with the central chamber for permitting a choker cable to pass through the butt hook. The choker cable end or ferrule residing within the butt hook after insertion thereof includes an enlarged sleeve which is cohesively bonded to the cable end. The ferrule is inserted by passing same through the entrance aperture in the butt hook and then through the central chamber to a final seated position within the butt hook wherein the associated choker cable passes downwardly through the bottom aperture. Resilient means project from the interior wall of the butt hook thereby securing the seated ferrule in place, yet permitting rapid hookup and detachment thereof as desired, a result heretofore not achieved to the degree achieved by the present invention. Further, a smooth plug is inserted and retained by the ferrule tip thereby substantially eliminating metal to metal wear between ferrule and butt hook. Accordingly, among the salient objects of the invention are:

To provide a butt rigging which remains intact during traverse of a haul back line;
To provide a butt hook and ferrule retaining means capable of permitting rapid hookup and release thereof; and
To provide a ferrule assembly substantially reducing metal to metal wear between butt hook and ferrule.

Figure 5:
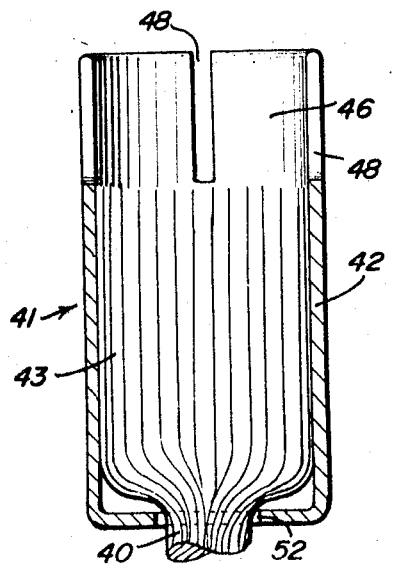
Figure 6:
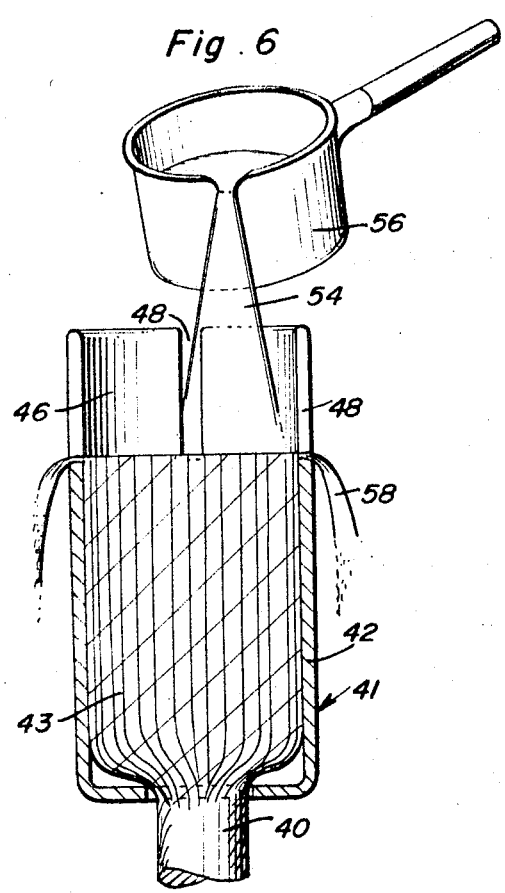
Figure 7:
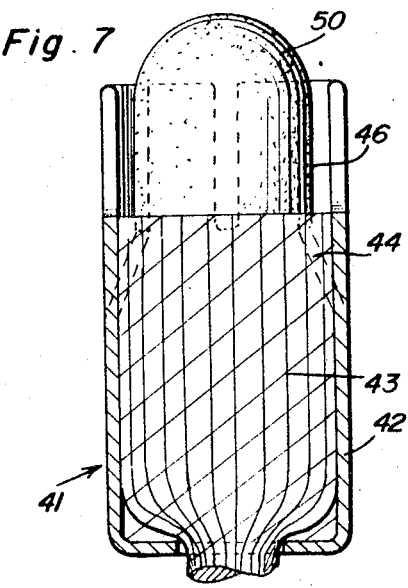

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view in perspective illustrating the utilization of a butt rigging as applied to a log.
FIGURE 2 is a front elevational view of the butt hook and associated ferrule installed therein.
FIGURE 3 is a sectional elevational view taken along a plane passing through section line 3—3 of FIGURE 2.
FIGURE 4 is a top sectional view of the butt housing and installed ferrule taken along a plane passing through section line 4—4 of FIGURE 3.
FIGURE 5 is an exploded elevational view of a ferrule sleeve with an unraveled cable end residing therein.
FIGURE 6 is a view of the ferrule sleeve as illustrated in FIGURE 5 together with a molten babbet application apparatus.
FIGURE 7 is a view similar to that depicted in FIGURE 6 together with a rubber plug inserted into the free tip of the ferrule. The lines drawn in phantom illustrate crimped walls of the ferrule around the plug.

In the preferred embodiment of the invention, reference numeral 10 generally relates to a cylindrical housing or butt hook with a dome-like top. Integrally appending from the dome-like top of butt hook 10 is a connection ear 12 including an apertured portion 14 through which passes a shackle 16 for suspending butt hook 10. An exteriorly opening central cylindrical chamber 18 is disposed within the intermediate length of cylindrical housing 10, one end of the central chamber terminating in a flared wall portion opening outwardly toward the dome-like top of cylindrical housing 10 and communicating with a cylindrical aperture 20 disposed perpendicularly of the cylindrical chamber 18. The cylindrical wall portion of aperture 20 constitutes a socket 22 characterized by open ends for receipt of a ferrule member as more completely explained hereinafter. The central chamber 18 is further characterized by a cylindrical seat 24 disposed opposite the outwardly flared end 19. A concave oblong cutout 26 is formed through the central chamber wall portion of housing 10 and includes rounded coplanar longitudinal sides 28 terminating at one end thereof in a rounded upwardly facing arcuate end portion 30 disposed immediately above the cylindrical seat 24 and terminating at the opposite end thereof by a split arcuate downwardly facing end portion 31 disposed along an intermediate length of the cylindrical chamber 18. The combined outline configuration of the central chamber 18, cylindrical aperture 20, and concave cutout 26 resembles an asymmetrical dumbbell shaped keyhole slot generally denoted by reference numeral 29 oriented longitudinally of the housing 10 for permitting manipulation of a ferrule 41 within the housing to a final seated position. A longitudinally oriented slot 32 disposed diametrically opposite and parallel to the keyhole slot 29 and extending a length equal thereto permits the sliding of a choker cable 40 downwardly through the housing 10. The slit 32 extends downwardly through the housing base portion 34 thereby creating smoothly rounded confronting base web edges 33. The slit 32 terminates in a base aperture 35 disposed perpendicularly through the base of housing 10 for snugly restraining choker cables 40 therein. Two elastomeric rod-like projections 36 are positioned within apertures 38, the apertures are formed within substantially diametrically opposite interior wall portions of the central chamber 18. The projections overlie each other in spaced relation thereto and extend into the central chamber at points positioned above the normally seated ferrule 41. Pin retainers 39 secure projections 36 within their respective apertures 38, the pins themselves are retained within the housing 10 and are disposed perpendicularly through the projections.

The ferrule member 41 includes a hollow cylindrical sleeve portion 42 of smaller diameter than the width of longitudinally disposed housing slit 32 thereby facilitating a sliding passage of ferrule 41 therethrough to cylindrical seat 24. The sleeve portion 42 tapers to a conical section 44 which in turn extends into a cylindrical sleeve portion 46 of smaller diameter than cylindrical aperture 20 thereby facilitating insertion of ferrule member 41 therein. The cylindrical sleeve portion 46 contains slits 48 longitudinally formed within the walls of the same. The hollowed tip of the cylindrical sleeve portion 46 is capped with a spherical plug 50 of elastomeric material or metal. The base of cylindrical portion 42 includes a centrally located aperture 52 for receiving choker cable 40. In the seated position, the spherical plug 50 engages the lower projection 36 and is retained thereby.

As seen in FIGURES 5-7 of the drawings, in actual fabrication of the ferruled choker cable, the cable 40 is passed through the base aperture 52 and is unraveled within cylindrical portion 42. The strands of wire 43 resulting from the unraveling of cable 40 are cleaned by a suitable acid solution then subjected to molten babbet 54 poured from a suitable pot container 56. The slits 48 in the wall of cylindrical seat portion 42 provide escape means for excess molten babbet 58. In addition, the slitted cylindrical sleeve portion 46 forms a sleeve amenable for crimping or swaging after the babbeting is completed. A spherical plug 50 is inserted into the opening in the cylindrical sleeve portion 46. Then, the cylindrical walls of sleeve portion 46 are swaged or crimped to form a conical tapered section 44 extending to a cylindrical section 46 of smaller diameter than cylindrical portion 42 as shown in phantom in FIGURE 7.

As will be appreciated from FIGURE 3 of the drawings, insertion of the ferrule 41 into butt hook housing 10 is accomplished as follows: The smaller cylindrical sleeve portion 46 of the ferrule is inserted into cylindrical aperture 20 and the ferrule 41 is turned downwardly thereby admitting the conical section 44 and larger cylindrical sleeve portion 42 of the ferrule in the central chamber 18. The ferrule is then pulled downwardly past the resiliently yieldable elastomeric projections 36 and is positioned with the plug tip facing upwardly thereby facilitating a final resting of the ferrule base into the cylindrical seat 24. A longitudinally oriented slit 32 diametrically opposite the keyhole slot 29 is provided for allowing passage of the choke cable 40 through the housing 10 for final positioning of the cable within cable aperture 35 located in the base of the housing 10. In order to remove the ferrule when replacement of such is desired or for other suitable reasons, the aforementioned process is reversed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A butt hook and ferrule assembly comprising a generally cylindrical hollow housing, means for suspending one end of said housing, cable means, ferrule means on one end of said cable means, resiliently yieldable means projecting from the interior wall of said housing, and central chamber means within said housing for permitting insertion of said cable ferrule means past said resilient yieldable means for final seating within said housing.

2. A butt hook and ferrule assembly as defined in claim 1 wherein said means suspending one end of said housing includes an integrally apertured connecting ear thereon, said central chamber in the housing characterized by a longitudinally disposed and exteriorly opening cylindrical hollow chamber communicating at one end thereof with a cylindrical aperture the axis of which is oriented perpendicularly to the axis of said central chamber, a second end of said central chamber terminating in a cylindrical seat.

3. A construction as defined in claim 2 wherein said cable ferrule means comprises a first hollow right cylindrical end portion, the base thereof permitting entrance of said cable therein, an intermediately conical section communicating with said cylindrical end portion, a second hollow right cylindrical section of smaller diameter than that of said first right cyindrical section communicating with said conical section, and plug means capping the outwardly disposed end of said second right cylindrical section.

4. A construction as defined in claim 3 wherein said second right cylindrical section includes longitudinally disposed slits in the wall portions thereof for allowing crimped contact between said wall portions about said plug means.

5. The construction as defined in claim 4 wherein said resiliently yieldable means is in the form of a pair of projections of an elastomeric material retained within an aperture formed within the wall portion of said cylindrical housing and fastened therein by pin means, the ends of said pin means being fastened within the wall portions, said pin and said resiliently yieldable means disposed substantially perpendicular to one another.

6. The construction as defined in claim 5 wherein said cable end is retained within said ferrule means by a cohesive bond therebetween.

7. A method of fabricating a ferrule from a hollow right cyindrical stem, one end section of said stem including slits therein, the steps comprising, inserting a wire cable into said stem, the end of said cable coinciding with said slits, unraveling said inserted cable end, subjecting said inserted cable end to acid for cleaning same, subjecting said cleaned inserted cable end to molten babbet permitting molten babbet to escape from intermediate points along the length of said ferrule, plugging said end portion of said stem, subjecting said plugged stem end to metal deformation whereby said plug is secured within said end portion of said sttem.

8. A butt hook structure comprising, a cylindrical domed top housing, an integral connecting ear extending therefrom, a cylindrical aperture extending through said cylindrical housing immediately below said domed top, the axis of said aperture oriented perpendicularly to the axis of said housing, and outwardly opening cylindrical center chamber formed within the intermediate length of said housing and communicating with said cylindrical aperture, the base of said housing containing an apertured portion communicating with a lower portion of said cylindrical central chamber, the lower wall portion of said central chamber being cut out to form a generally oblong shape, the combined outline of said cylindrical aperture, central chamber and oblong forming a keyhole slot resembling an asymmetrical dumbbell, a longitudinal slot disposed diametrically opposite said keyhole shaped slot for permitting the passage of a cable therethrough, the base of said cylindrical central chamber terminating in a right cylindrical seat, and at least one elastomeric rod projecting from the wall portions of said housing and projecting inwardly through said central chamber.

9. A ferrule member comprising a first hollow cylindrical sleeve section including a base wall containing an aperture therein, an end opposite said base tapering to form a conical section, said conical section further extending to a second hollow cylindrical sleeve section being open ended and characterized by longitudinal slits formed therein, a spherical plug projecting from said open end, and a cable passing through said aperture and terminating within the hollow of said first cylindrical and concial sections and cohesively bonded thereto.

References Cited

UNITED STATES PATENTS

| | | |
|---|---|---|
| 561,855 | 6/1896 | Baptist. |
| 3,153,268 | 10/1964 | Johnson. |
| 3,289,259 | 12/1966 | Laharty. |

BERNARD A. GELAK, Primary Examiner

U.S. Cl. X.R.

24—114.5; 294—78